(12) United States Patent
Park et al.

(10) Patent No.: US 10,773,743 B2
(45) Date of Patent: Sep. 15, 2020

(54) GRIP DETECTION SYSTEM AND METHOD OF STEERING WHEEL FOR AUTONOMOUS VEHICLE

(71) Applicants: Hyundai Motor Company, Seoul (KR); Kia Motors Corporation, Seoul (KR); Omron Automotive Electronics Korea Co., Ltd., Anseong-si (KR)

(72) Inventors: Jong Min Park, Seoul (KR); Nak Kyoung Kong, Seongnam-si (KR); Nam-Sook Park, Seoul (KR); Young-Sun Seo, Seoul (KR)

(73) Assignees: Hyundai Motor Company, Seoul (KR); Kia Motors Corporation, Seoul (KR); Omron Automotive Electronics Korea Co., Ltd., Anseong-si (KR)

( * ) Notice: Subject to any disclaimer, the term of this patent is extended or adjusted under 35 U.S.C. 154(b) by 0 days.

(21) Appl. No.: 16/162,708

(22) Filed: Oct. 17, 2018

(65) Prior Publication Data
US 2019/0185039 A1    Jun. 20, 2019

(30) Foreign Application Priority Data
Dec. 19, 2017  (KR) .................... 10-2017-0175051

(51) Int. Cl.
*B62D 1/04* (2006.01)
*B62D 15/02* (2006.01)
(Continued)

(52) U.S. Cl.
CPC ............ *B62D 1/046* (2013.01); *B60K 28/066* (2013.01); *B60W 50/14* (2013.01); *B62D 1/06* (2013.01);
(Continued)

(58) Field of Classification Search
USPC ............................................. 701/41
See application file for complete search history.

(56) References Cited

U.S. PATENT DOCUMENTS 5,585,733 A * 12/1996 Paglione .................. G01B 7/02
324/676
8,155,837 B2 * 4/2012 Aoki ...................... B60Q 1/0082
340/665
(Continued)

FOREIGN PATENT DOCUMENTS

FR       3 034 389 A1    10/2016
JP       2015-131631 A    7/2015
(Continued)

OTHER PUBLICATIONS

Zhao, Dong-Lin et al., *Preparation and microwave absorption properties of carbon nanocoils*, Material Letters, Apr. 16, 2008, pp. 3704-3706, vol.-Issue No. 62, Elsevier B.V.

*Primary Examiner* — Jean Paul Cass
(74) *Attorney, Agent, or Firm* — Morgan, Lewis & Bockius LLP (57) ABSTRACT

A grip detection system of a steering wheel for an autonomous vehicle, may include an autonomous driving portion which autonomously drives a vehicle; a contact detector which is mounted on a steering wheel of the vehicle, and detects a change in capacitance due to contact between a driver and a steering wheel; a control portion which determines that the driver contacts with the steering wheel if the change in capacitance is received from the contact detector, and generates a warning signal when determining that the driver does not contact with the steering wheel if the change in capacitance is not received from the contact detector; and an output portion which receives the warning signal, and outputs the warning signal to outside.

17 Claims, 6 Drawing Sheets

(51) Int. Cl.
*B62D 1/06* (2006.01)
*B60W 50/14* (2020.01)
*B60K 28/06* (2006.01)

(52) U.S. Cl.
CPC ......... *B62D 15/025* (2013.01); *B62D 15/029* (2013.01)

(56) References Cited

U.S. PATENT DOCUMENTS

| | | | |
|---|---|---|---|
| 8,838,323 B2 * | 9/2014 | Matsunaga | B60W 30/10 |
| | | | 701/28 |
| 8,874,301 B1 | 10/2014 | Rao et al. | |
| 2003/0116844 A1 * | 6/2003 | Tateoka | H01L 23/66 |
| | | | 257/728 |
| 2005/0242965 A1 | 11/2005 | Rieth et al. | |
| 2013/0092677 A1 * | 4/2013 | Virnich | B60N 2/5685 |
| | | | 219/204 |
| 2014/0339211 A1 | 11/2014 | Barfuss et al. | |
| 2017/0262099 A1 * | 9/2017 | Nathan | G06F 3/044 |
| 2018/0015932 A1 * | 1/2018 | McMillen | B60W 50/0098 |
| 2018/0216958 A1 * | 8/2018 | Park | B60W 10/04 |
| 2018/0217254 A1 * | 8/2018 | Hong | H01Q 1/32 |
| 2018/0217255 A1 * | 8/2018 | Kim | B60W 50/14 |
| 2018/0217710 A1 * | 8/2018 | Cholasta | G06F 3/0416 |
| 2018/0284048 A1 * | 10/2018 | Wakana | G01N 27/121 |
| 2018/0312167 A1 * | 11/2018 | Kundu | B60W 40/08 |
| 2019/0131969 A1 * | 5/2019 | Boese | H03K 17/962 |

FOREIGN PATENT DOCUMENTS

| | | |
|---|---|---|
| JP | 2016-527657 A | 9/2016 |
| JP | 2017-087883 A | 5/2017 |
| KR | 10-1470190 B1 | 12/2014 |
| KR | 10-2017-0109275 A | 9/2017 |

* cited by examiner

GRIP DETECTION SYSTEM AND METHOD OF STEERING WHEEL FOR AUTONOMOUS VEHICLE

CROSS REFERENCE TO RELATED APPLICATION

The present application claims priority to Korean Patent Application No. 10-2017-0175051, filed Dec. 19, 2017, the entire contents of which is incorporated herein for all purposes by this reference.

BACKGROUND OF THE INVENTION

Field of the Invention

The present invention relates generally to a grip detection system and method of a steering wheel for an autonomous vehicle. More particularly, the present invention relates to a grip detection system and method of a steering wheel for an autonomous vehicle, which can rapidly switch to manual mode in an unexpected situation by periodically checking whether a driver intends to manually drive a vehicle during autonomous driving.

Description of Related Art

Generally, an autonomous vehicle means a vehicle which autonomously drives to an appointed destination by recognizing a surrounding environment without the intervention of a driver, and controlling the vehicle by the determination of a driving situation. Recently, the autonomous vehicle has received attention as future personal means of transportation, which can increase convenience by reducing traffic accidents, improving traffic efficiency, reducing fuel use, and driving the vehicle in place of persons.

The autonomous vehicle does not yet perfectly work in comparison to normal human driving, so an unexpected situation may occur. For example, input may not be allowed at some times because the power supply of a camera sensor is unstable, or information may not be obtained because an object, such as a leaf, is attached to the surface of a laser sensor. In case of such unexpected situations, the autonomous vehicle transfers driving control authority to the driver, securing the safety of the driver.

Accordingly, the autonomous vehicle may periodically check whether the driver grips a steering wheel. In other words, when an unexpected situation occurs, if the driver sleeps or looks back, the driving control authority cannot be rapidly converted. Thus, the autonomous vehicle may periodically check whether the driver grips a steering wheel, and prepare for the quick transfer of the driving control authority to the driver when the unexpected situation occurs.

A conventional autonomous system usually has a function of inducing the driver to grip the steering wheel after an unexpected situation occurs. However, the driver cannot rapidly respond to the unexpected situation if the driver is asleep, so a traffic accident may be caused.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a grip detection system and method of a steering wheel for an autonomous vehicle, which can rapidly switch to manual mode in an unexpected situation by periodically checking whether a driver intends to manually drive a vehicle during autonomous driving.

In various aspects of the present invention, there is provided a grip detection system of a steering wheel for an autonomous vehicle, the system including: an autonomous driving portion which autonomously drives a vehicle; a contact detector which is mounted on a steering wheel of the vehicle, and detects a change in capacitance due to contact between a driver and a steering wheel; a control portion which determines that the driver contacts with the steering wheel if the change in capacitance is received from the contact detector, and generates a warning signal when determining that the driver does not contact with the steering wheel if the change in capacitance is not received from the contact detector; and an output portion which receives the warning signal, and outputs the warning signal to the outside.

Furthermore, there is provided the grip detection system, wherein the contact detector may include: an electrode which is provided along an internal circumference of the steering wheel of the vehicle, and forms capacitance; and a dielectric which is stacked on the electrode, and amplifies the capacitance formed by the electrode.

Furthermore, there is provided the grip detection system, wherein the dielectric may include a carbon micro coil (CMC) or a carbon nano coil (CNC).

Furthermore, there is provided the grip detection system, wherein the dielectric is formed to have elastic force.

Furthermore, there is provided the grip detection system, further including: a low frequency generation portion which generates a low frequency, and delivers the low frequency to the electrode; a heating guidance portion which generates a high frequency, and delivers the high frequency to the electrode; a counter which periodically counts time, and delivers a driver detection signal to the control portion at every predetermined time; and an input portion which receives a heating signal from the driver, and delivers the heating signal to the control portion, wherein the control portion controls the low frequency generation portion to generate the low frequency in a case of receiving the driver detection signal from the outside, and controls the high frequency generation portion to generate the high frequency in a case of receiving the heating signal from the outside, wherein when the low frequency generation portion generates the low frequency, the electrode forms the capacitance, and the dielectric amplifies the capacitance, and wherein when the heating guidance portion generates the high frequency, the high frequency is applied to the electrode, and the dielectric absorbs the high frequency and releases the high frequency as thermal energy.

Furthermore, there is provided the grip detection system, further including: a temperature sensor for measuring a temperature of the dielectric, wherein in a state that the heating guidance portion generates the high frequency, when the temperature of the dielectric, which is measured by the temperature sensor, exceeds a predetermined allowable temperature, the control portion controls the heating guidance portion not to generate the high frequency, and controls the low frequency generation portion to generate the low frequency.

Furthermore, there is provided the grip detection system, wherein the electrode may include one pair divided into a first electrode receiving the low frequency from the low frequency generation portion, and a second electrode receiving the high frequency from the heating guidance portion.

Furthermore, there is provided the grip detection system, further including: a low frequency generation portion which generates a low frequency, and delivers the low frequency to the electrode; and a heating guidance portion which receives a power supply, and delivers the power supply to the electrode, wherein the control portion controls the low frequency generation portion to generate the low frequency in a case of receiving the driver detection signal from the outside, and controls the heating guidance portion to deliver the power supply to the electrode in a case of receiving the heating signal from the outside, wherein when the low frequency generation portion generates the low frequency, the electrode forms the capacitance, and the dielectric amplifies the capacitance, and wherein when the heating guidance portion delivers the power supply, a current flows through the electrode, generating heat by resistance of the electrode.

Furthermore, there is provided the grip detection system, further including: a temperature sensor for measuring a temperature of the dielectric, wherein in a state that the heating guidance portion delivers the power supply, when the temperature of the electrode, which is measured by the temperature sensor, exceeds a predetermined allowable temperature, the control portion controls the heating guidance portion to control a voltage, a current, or a pulse width modulation (PWM) of the power supply delivered to the electrode.

Furthermore, there is provided the grip detection system, further including: a counter which periodically counts time, and delivers a driver detection signal to the control portion at every predetermined time; and an input portion which receives a heating signal from the driver, and delivers the heating signal to the control portion.

Furthermore, there is provided the grip detection system, further including: a driver monitoring portion for monitoring a body abnormality signal of the driver, wherein in a case of generating the warning signal, the control portion determines whether the body abnormality signal of the driver is received from the driver monitoring portion, and after determination, the warning signal is output if the body abnormality signal of the driver is not received from the driver monitoring portion, and an emergency mode is executed if the body abnormality signal of the driver is received from the driver monitoring portion.

Furthermore, there is provided the grip detection system, wherein in a case of executing the emergency mode, the control portion controls the autonomous driving portion to park the vehicle on the side of a road, or to stop the vehicle.

Furthermore, there is provided the grip detection system, further including: a storage portion in which a critical value and a reference value with respect to the change in capacitance are stored; and an input portion which inputs a critical value setup signal to the control portion, wherein when the change in capacitance is received from the contact detector after the critical value setup signal is received from the input portion, the control portion determines a correction value by comparing the change in capacitance with the reference value, and stores a determined correction value in the storage portion by setting up the determined correction value as a critical value.

Furthermore, there is provided a grip detection method of a steering wheel for an autonomous vehicle, the method including: a process of reception, wherein a change in capacitance due to contact between a driver and a steering wheel is received from a contact detector mounted on the steering wheel of a vehicle; a process of determination, wherein it is determined that the driver contacts with the steering wheel if the change in capacitance is received from the contact detector, and it is determined that the driver does not contact with the steering wheel if the change in capacitance is not received from the contact detector; a process of generation, wherein a warning signal is generated if it is determined that the driver does not contact with the steering wheel; and a process of output, wherein the output portion is controlled to output the warning signal to the outside by delivering the warning signal to the output portion.

Furthermore, there is provided the grip detection method, further including: before the process of reception, a process of detection, wherein a driver detection signal is received from a counter which periodically counts time, wherein the step of reception may include: a step of control, wherein in a case of receiving the driver detection signal, a low frequency generation portion applies a low frequency to the contact detector, controlling an electrode of the contact detector configured to form capacitance, and a dielectric of the contact detector configured to amplify the capacitance; and a step of reception, wherein a change in the capacitance amplified by the dielectric due to contact between the driver and the steering wheel is received.

Furthermore, there is provided the grip detection method, further including: before the process of reception, a process of input, wherein a heating signal is received from an input portion; and a process of applying a high frequency, wherein in a case of receiving the heating signal, a heating guidance portion applies a high frequency to the contact detector, so an electrode of the contact detector forms the high frequency, and a dielectric of the contact detector absorbs the high frequency and releases the high frequency as thermal energy.

Furthermore, there is provided the grip detection method, further including: after the process of applying high frequency, a process of reception, wherein a temperature of the dielectric is received from a temperature sensor; and a process of control, wherein in case that the temperature of the dielectric, which is measured by the temperature sensor, does not exceed a predetermined allowable temperature, the heating guidance portion is controlled not to apply the high frequency any more, wherein a process of reception may include: a step of control, wherein in case that the heating guidance portion does not apply the high frequency, the low frequency generation portion applies the low frequency to the contact detector, controlling the electrode of the contact detector configured to form capacitance, and the dielectric of the contact detector configured to amplify the capacitance; and a step of reception, wherein a change in the capacitance amplified by the dielectric due to contact between the driver and the steering wheel is received.

Furthermore, there is provided the grip detection method, further including: before the process of reception, a process of input, wherein a heating signal is received from an input portion; and a process of applying a power apply, wherein in a case of receiving the heating signal, a heating guidance portion applies a power supply to the contact detector, so a current flows through the electrode of the contact detector, and heat is generated by resistance of the electrode.

Furthermore, there is provided the grip detection method, further including: after the process of applying a power supply, a process of reception, wherein a temperature of the dielectric is received from a temperature sensor; and a process of control, wherein in case that the temperature of the dielectric, which is measured by the temperature sensor, exceeds a predetermined allowable temperature, the heating guidance portion controls a voltage, a current, or a pulse width modulation (PWM) of the power supply, lowering a temperature of the electrode, wherein a process of reception includes: a step of control, wherein in case that the heating guidance portion controls the voltage, the, the current, or the pulse width modulation (PWM) of the power supply, the low frequency generation portion applies the low frequency to the contact detector, so that the electrode of the contact detector forms capacitance, and the dielectric of the contact detector amplifies the capacitance; and a step of reception, wherein a change in the capacitance amplified by the dielectric due to contact between the driver and the steering wheel is received.

Furthermore, there is provided the grip detection method, further including: after the process of input, a process of determining abnormality whether a body abnormality signal of the driver is received from a driver monitoring portion which monitors the body abnormality signal of the driver; and a process of executing emergency mode, wherein in case that the body abnormality signal is not received from the driver monitoring portion, the process of input is executed, and in case that the body abnormality signal of the driver is received from the driver monitoring portion, an emergency mode is executed.

Furthermore, there is provided the grip detection method, wherein in a process of executing emergency mode, in a case of executing the emergency mode, the control portion controls the vehicle to park on an edge portion of a road, or to stop the vehicle.

The present invention has an effect of rapidly switching to manual mode in an unexpected situation by periodically checking whether the driver intends to manually drive the vehicle during autonomous driving.

Furthermore, the contact detector is configured to both detect the change in capacitance and have the function of a hot wire. Accordingly, since any separate hot wire is not necessary, the thickness of the steering wheel may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, a grip detection system and method of a steering wheel for an autonomous vehicle according to exemplary embodiments of the present invention will be described in detail with reference to the accompanying drawings.

Figure 1:
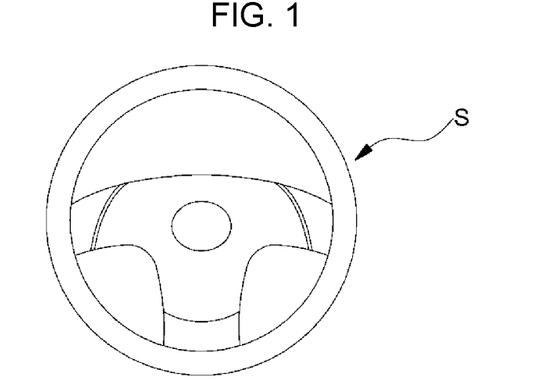
FIG. 1 is a view illustrating a steering wheel to which a grip detection system of a steering wheel for an autonomous vehicle according to an exemplary embodiment of the present invention is applied.

FIG. 1 is a view illustrating a steering wheel to which a grip detection system of a steering wheel for an autonomous vehicle according to an exemplary embodiment of the present invention is applied.

Figure 2:
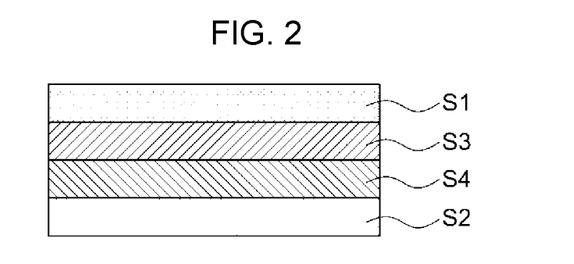
FIG. 2 is a view schematically illustrating a cross section of a steering wheel to which a conventional contact detector is applied.
Figure 3:
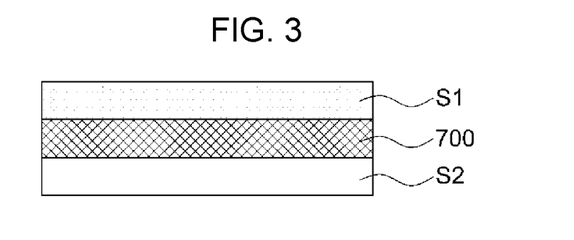
FIG. 3 is a view schematically illustrating a cross section of a steering wheel to which a contact detector included in the grip detection system of a steering wheel for an autonomous vehicle according to an exemplary embodiment of the present invention is applied.

With reference to FIG. 1, an autonomous driving system 10 for autonomously driving a vehicle periodically checks whether a driver intends to manually drive the vehicle, whereby transfer to manual mode for driving the vehicle in person when an unexpected situation occurs may be rapidly realized. Accordingly, the autonomous driving system 10 in an exemplary embodiment of the present invention includes a contact detector 700 (see FIG. 3) mounted on a steering wheel S of the vehicle; a control portion 900 (see FIG. 8); and an output portion 400 (see FIG. 8). The contact detector 700 is to detect the driver's hands contacting with the steering wheel S of the vehicle using capacitance. With reference to FIG. 2 and FIG. 3, the difference between the contact detector 700 in an exemplary embodiment of the present invention and that of a related art will be described.

FIG. 2 is a view schematically illustrating a cross section of a steering wheel to which a conventional contact detector is applied, and FIG. 3 is a view schematically illustrating a cross section of a steering wheel to which a contact detector included in the grip detection system of a steering wheel for an autonomous vehicle according to an exemplary embodiment of the present invention is applied.

First, with reference to FIG. 2, the steering wheel to which the conventional contact detector is applied includes a circular rim S2; a hot wire S4 provided along the circular rim S2; the contact detector S3 using capacitance; and an external material S1 covering the components. The steering wheel S may be separately provided with the hot wire S4 and the contact detector S3, respectively, so there is a problem that the total thickness of the steering wheel is increased.

Furthermore, with reference to FIGS. 1 and 3, the steering wheel S to which the contact detector 700 in an exemplary embodiment of the present invention is applied includes a circular rim S2; the contact detector 700 using capacitance; and an external material S1 covering the components. In this regard, since the contact detector 700 is configured to both detect a change in capacitance and have the function of a hot wire, a hot wire and the contact detector 700 may not be separately prepared, so that the thickness of the steering wheel S may be reduced.

Figure 4A:
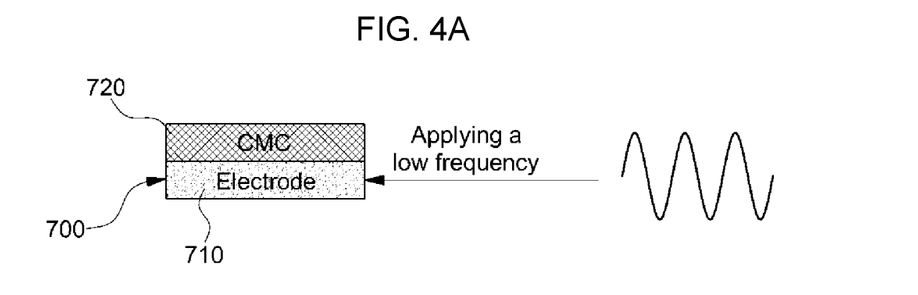
FIG. 4A, FIG. 4B, and FIG. 4C are views schematically illustrating the contact detector included in the grip detection system of a steering wheel for an autonomous vehicle according to an exemplary embodiment of the present invention.
Figure 4B:
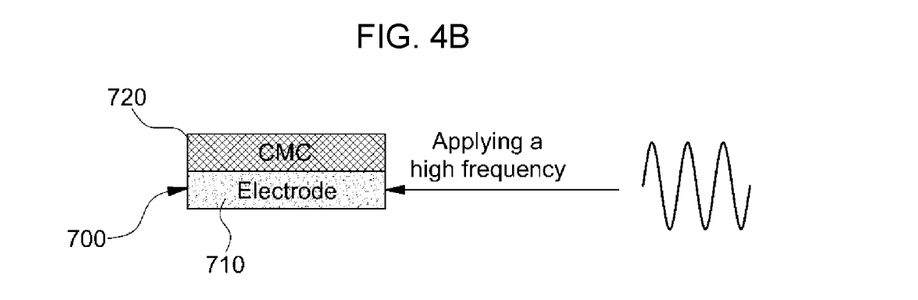
Figure 4C:
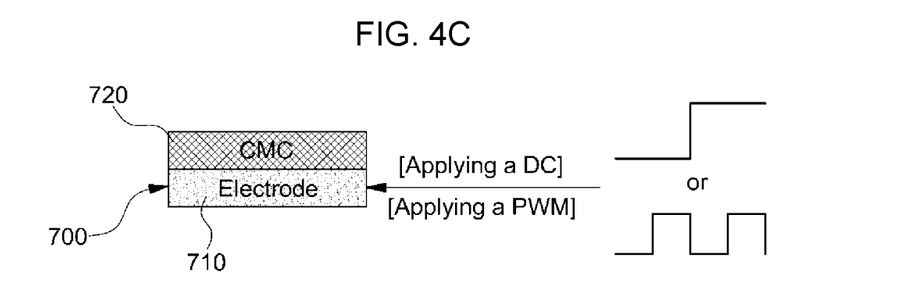

FIG. 4 is a view schematically illustrating the contact detector included in the grip detection system of a steering wheel for an autonomous vehicle according to an exemplary embodiment of the present invention.

With reference to FIG. 4A, the contact detector 700 is provided along an internal circumference of the steering wheel S of the vehicle, and includes an electrode 710 forming capacitance; and a dielectric 720 which is stacked on the electrode 710, and amplifies the capacitance formed by the electrode 710. The electrode 710 includes ordinary anode and cathode signal lines, and the anode signal line is spaced from the cathode signal line to form a capacitor. The dielectric 720 is electrically connected to the electrode 710, and includes a material with dielectric permittivity, e.g., a carbon micro coil (CMC). The dielectric 720 plays a role in amplifying electromotive force generated from the electrode 710, so it can improve the sensitivity of the contact detector 700. Furthermore, the dielectric 720 may be substituted with a carbon nano coil (CNC). Also, since the CMC may be mixed with other materials, the dielectric 720 may be manufactured by mixing silicon with a CMC material to impart a cushiony feeling to the steering wheel S. Accordingly, the contact detector 700 has an elasticity. In the present way, if the dielectric 720 has an elasticity, detecting is available from a specific distance to the extent of pressing the dielectric 720, so it is suitable for a detecting condition of the steering wheel S. Furthermore, according to materials mixed in the dielectric 720, various types of resistance enhancing designs, such as vibration, durability, water tightness, etc., are available. The main function of the contact detector 700 in an exemplary embodiment of the present invention is to detect a change in capacitance. Accordingly, the electrode 710 of the contact detector 700 detects a change in capacitance by receiving a low frequency from the outside. The dielectric 720 amplifies the capacitance formed by the electrode 710 by receiving the low frequency from the electrode 710. In this regard, the low frequency means about 1 kHz to 500 kHz.

Meanwhile, with reference to FIG. 4B, according to the contact detector 700 of the present invention, the steering wheel S may be configured to radiate heat in cold weather, such as in winter. In this regard, since a CMC material tends to absorb a high frequency, the high frequency instead of a low frequency is applied to the electrode 710 of the contact detector 700. As such, the electrode 710 detects a change in capacitance by receiving the high frequency. The dielectric 720 absorbs the high frequency, and the high frequency is converted to thermal energy and radiated. In this regard, the high frequency means about 100 MHz to 10 GHz. In the present way, the contact detector 700 in an exemplary embodiment of the present invention both detects the change in capacitance and acts as the function of a hot line.

Furthermore, with reference to FIG. 4C, a DC power supply may be applied to the electrode 710 of the contact detector 700 of the present invention. At the instant time, the electrode 710 generates heat according to forms of a voltage and a current applied to the electrode 710, having a hot line effect. Also, the voltage applied to the electrode 710 may be controlled using a pulse width modulation (PWM). In the instant case, the electrode 710 has a resistance ingredient, so it generates heat by the current flowing through the electrode 710. The setting of a resistance value of the electrode 710 may easily be set up using Joule's law, etc. Also, in the instant case, the dielectric 720 may be omitted.

Figure 5A:
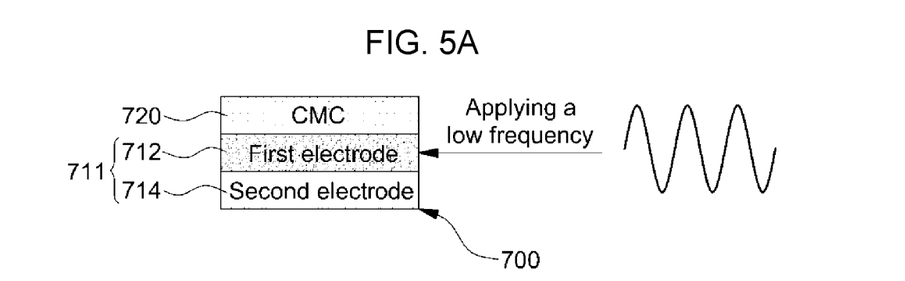
FIG. 5A and FIG. 5B are views schematically illustrating another example of the contact detector included in the grip detection system of a steering wheel for an autonomous vehicle according to an exemplary embodiment of the present invention.
Figure 5B:
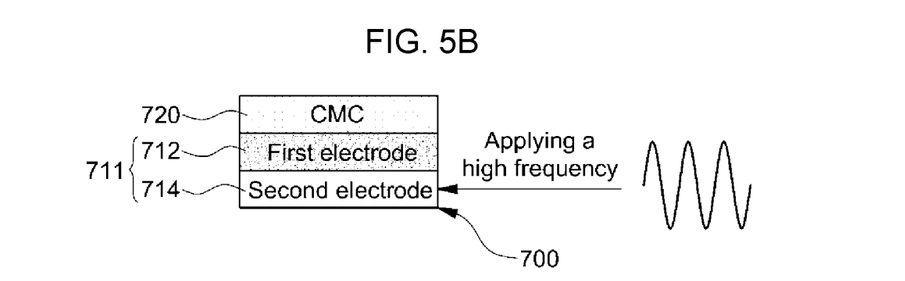

FIG. 5 is a view schematically illustrating another example of the contact detector included in the grip detection system of a steering wheel for an autonomous vehicle according to an exemplary embodiment of the present invention.

With reference to FIGS. 5A and 5B, regarding the contact detector 700, an electrode 711 may include a first electrode 712 and a second electrode 714. The reason for this is to prepare a case in which a low frequency and a high frequency cannot be simultaneously applied to one electrode 710 of FIG. 4. Accordingly, the low frequency is applied to the first electrode 712, and the high frequency or a power supply is applied to the second electrode 714. Also, the low frequency applied from the outside thereof is delivered to the first electrode 712 like FIG. 5A, and the high frequency or a power supply applied from the outside thereof is delivered to the second electrode 714 like FIG. 5B.

Figure 6A:
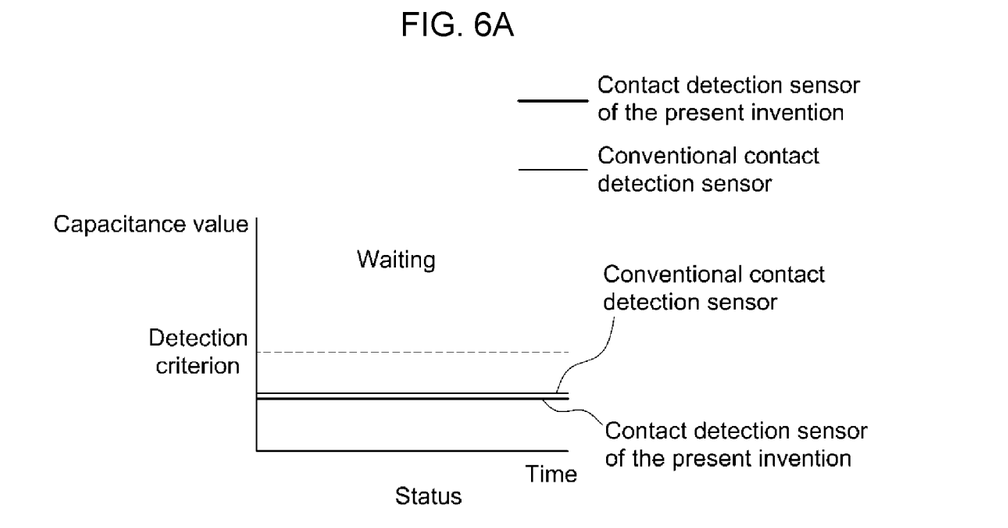
FIG. 6A, FIG. 6B, and FIG. 7 are graphs illustrated for describing a difference in contact sensitivity between the conventional detector and the contact detector included in the grip detection system of a steering wheel for an autonomous vehicle according to an exemplary embodiment of the present invention.
Figure 6B:
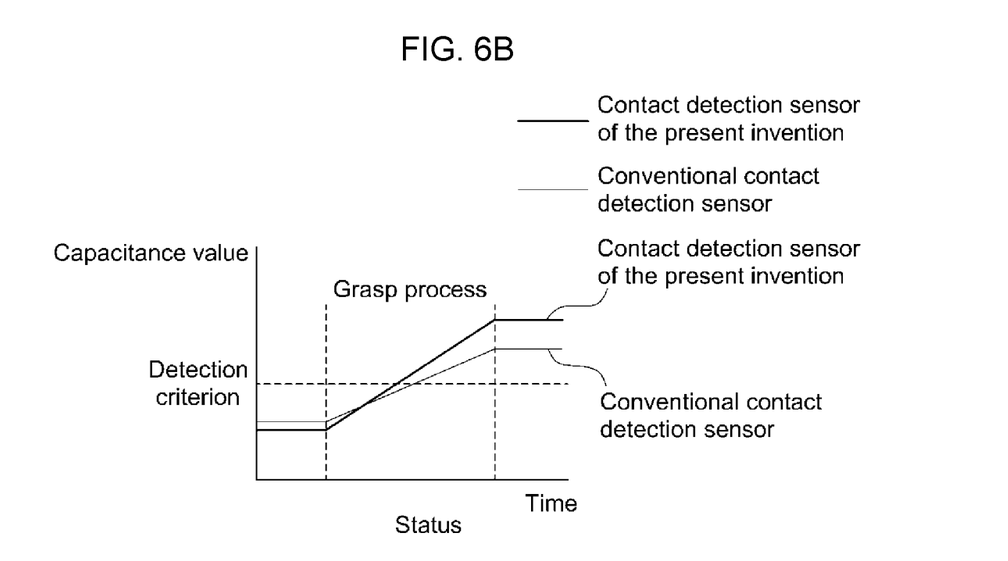
Figure 7:
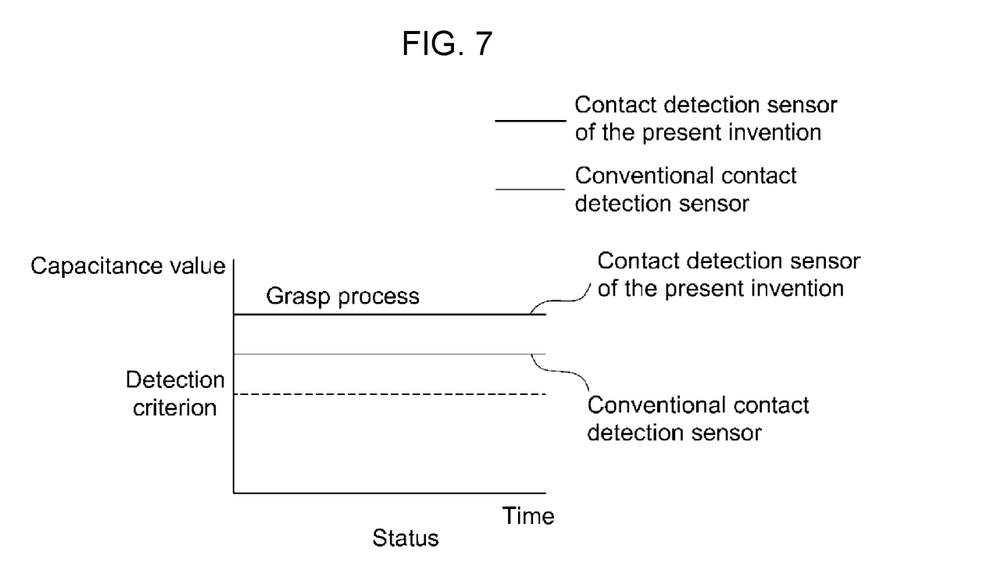

FIG. 6 and FIG. 7 are graphs illustrated for describing a difference in contact sensitivity between the conventional detector and the contact detector included in the grip detection system of a steering wheel for an autonomous vehicle according to an exemplary embodiment of the present invention.

With reference to FIG. 6A, the figure represents a waiting state in which a person's hands do not approach, and the contact detector 700 in an exemplary embodiment of the present invention has the same capacitance value as the conventional detector.

With reference to FIG. 6B, the figure represents a process of gripping the steering wheel S by approaching a person's hands, and the changed value of capacitance of the contact detector 700 in an exemplary embodiment of the present invention is greater than that of the conventional contact detector.

With reference to FIG. 7, the figure represents a state of gripping the steering wheel by a person's hands, and the changed value of capacitance of the contact detector 700 in an exemplary embodiment of the present invention is greater than that of the conventional contact detector. Meanwhile, the changed value of capacitance of the contact detector 700 of FIG. 7 is set up as a critical value of the present invention. Also, the control portion 900 (see FIG. 8) which will be described later determines that a driver contacts with the steering wheel S if receiving the changed value of capacitance whose value is greater than the critical value, i.e. receiving a change in capacitance more than the critical value, from the contact detector 700.

The contact detector 700 in an exemplary embodiment of the present invention further includes the dielectric 720 other than the electrode 710, so that it has higher sensitivity than the conventional contact detector including only the conventional electrode 710. Thus, a driver's hands gripping the steering wheel S can more easily be detected.

Figure 8:
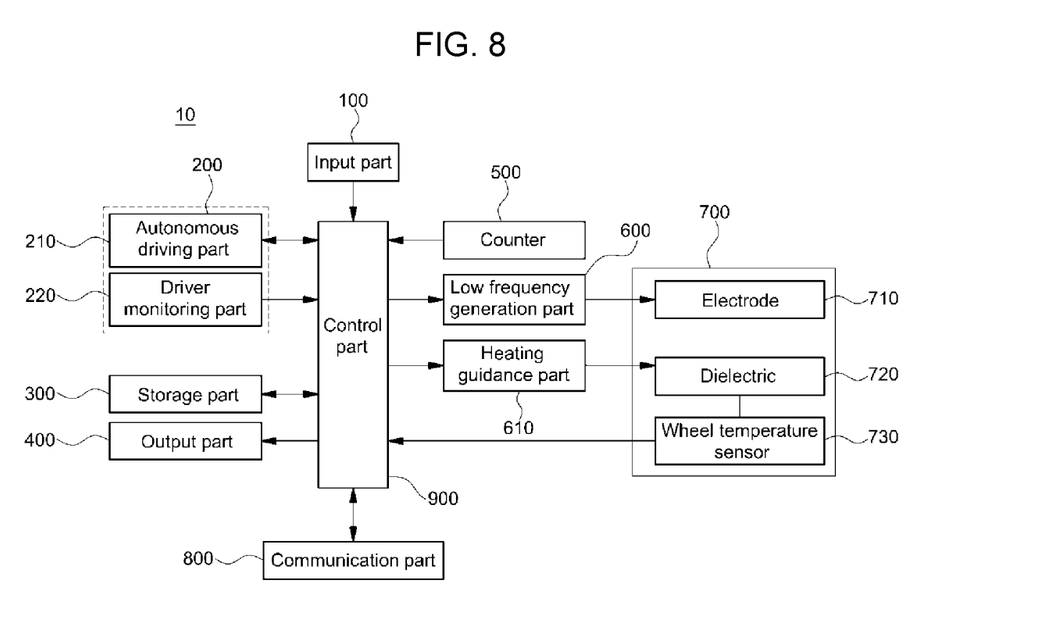
FIG. 8 is a block diagram schematically illustrated for describing the grip detection system of a steering wheel for an autonomous vehicle according to an exemplary embodiment of the present invention.

FIG. 8 is a block diagram schematically illustrated for describing the grip detection system of a steering wheel for an autonomous vehicle according to an exemplary embodiment of the present invention.

With reference to FIG. 1, FIG. 2, FIG. 3, FIG. 4, FIG. 5, FIG. 6, FIG. 7, and FIG. 8, the grip detection system of a steering wheel S for an autonomous vehicle 10 according to an exemplary embodiment of the present invention includes: an input portion 100; an autonomous driving module 200; a storage portion 300; the output portion 400; a counter 500; a low frequency generation portion 600; a heating guidance portion 610; the contact detector 700; the control portion 900; and a communication portion 800.

The input portion 100 is mounted on a dashboard of the vehicle, and may include various button parts or touch panels to receive various instructions from a driver. Furthermore, the input portion 100 may receive a heating signal from the driver, and deliver the signal to the control portion 900. Also, the input portion 100 may receive a critical value setup signal from the driver, and deliver the signal to the control portion 900.

The autonomous driving module 200 includes an autonomous driving portion 210 and a driver monitoring portion 220. The autonomous driving portion 210 is the system 10 for driving the vehicle to a destination without the intervention of the driver. In this regard, various sensors included in the vehicle autonomously decide a driving route by recognizing a surrounding environment, so that the vehicle is independently driven using autonomous power. The driver monitoring portion 220 determines whether the driver can currently drive the vehicle by collecting body information related to the driver. For example, if the detection, position, or direction of pupils is not in a predetermined normal state when receiving images of the driver from a camera mounted on the vehicle, i.e., in case that the driver does not keep eyes facing forward, a body abnormality signal is generated, and the generated body abnormality signal is delivered to the control portion 900. Also, the driver monitoring portion 220 receives the body information related to the driver from a body recognition sensor mounted on the vehicle and measures the current status of the driver, and can generate a body abnormal signal if the status is abnormal and deliver the signal to the control portion 900.

Under the control of the control portion 900, the communication portion 800 wirelessly transmits the body abnormality signal delivered to the control portion 900 to professional organizations, such as an external designated hospital, a police station, a telecommunication company, etc., to notify the current emergency of the driver. In this regard, wireless communication may be executed using WLAN (Wireless LAN), Wi-Fi (Wireless-Fidelity), DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc.

The storage portion 300 stores a critical value and a reference value with respect to a change in capacitance. The critical value means the lowest value of the changed value of capacitance, which is the reference of determination, when the control portion 900 determines whether the driver contacts with the steering wheel S, and the reference value means the changed value of capacitance, which is the reference of modification, when a user modifies the critical value.

The output portion 400 outputs warning sound by receiving a warning signal from the control portion 900, and may include a speaker, a display provided in the vehicle, etc. The warning sound may be a voice or a text message, such as "the driver is not gripping the steering wheel S" or "the vehicle will be stopped because the driver is not gripping the steering wheel S." In a case of the display, the warning signal may be output in various colors.

The counter 500 periodically counts time, and delivers a driver detection signal to the control portion 900 at every predetermined time, e.g., every ten seconds.

The low frequency generation portion 600 generates a low frequency, whose range is from 1 kHz to 500 kHz, by the control of the control portion 900, and delivers the low frequency to the electrode 710. The heating guidance portion 610 generates a high frequency, whose range is from 100 MHz to 106 Hz, by the control of the control portion 900, and delivers the high frequency to the electrode 710. Furthermore, in certain situations, the heating guidance portion 610 may be constituted to deliver a DC power supply instead of the high frequency to the electrode 710 by the control of the control portion 900.

The contact detector 700 is mounted on the steering wheel S, and detects a change in capacitance due to contact between the driver and the steering wheel S, and includes the electrode 710, the dielectric 720, and a wheel temperature sensor 730. Further, when the low frequency generation portion 600 generates a low frequency, the electrode 710 forms capacitance, and the dielectric 720 is constituted to amplify the capacitance. When the heating guidance portion 610 generates a high frequency, the electrode 710 forms capacitance, and the dielectric absorbs the high frequency and releases the high frequency as thermal energy. Furthermore, in certain situations, the heating guidance portion 610 is constituted to deliver the DC power supply instead of the high frequency to the electrode 710. Accordingly, when the heating guidance portion 610 delivers the DC power supply to the electrode 710, the electrode 710 receives the DC power supply and forms capacitance, and simultaneously, absorbs the DC power supply and releases the DC power supply as thermal energy.

The electrode 710 and the dielectric 720 were described in detail in FIG. 4 and FIG. 5, so that the detailed descriptions thereof are omitted. The wheel temperature sensor 730 is a sensor for measuring the temperature of the dielectric 720, and a normal sensor for measuring a temperature may be used as the wheel temperature sensor 730.

When the control portion 900 receives a change in capacitance from the contact detector 700, it is determined that the driver contacts with the steering wheel S. On the other hand, when the control portion 900 does not receive the change in capacitance from the contact detector 700, it is determined that the driver does not contact with the steering wheel S, so a warning signal is generated. Furthermore, when a driver observation signal is received from the counter 500, the control portion 900 controls the low frequency generation portion 600 to generate a low frequency. Further, when a heating signal is received from the input portion 100, the control portion 900 controls the heating guidance portion 610 to generate a high frequency.

Furthermore, when the heating guidance portion 610 delivers the high frequency to the electrode 710, in case that the temperature of the dielectric 720, which is measured by the wheel temperature sensor 730, exceeds a predetermined allowable temperature, the control portion 900 controls the heating guidance portion 610 not to generate the high frequency, and controls the low frequency generation portion 600 to generate the low frequency, lowering the temperature of the dielectric 720. Further, when the heating guidance portion 610 delivers the DC power supply instead of the high frequency to the electrode 710, in case the temperature of the electrode 710, which is measured by the wheel temperature sensor 730, exceeds a predetermined allowable temperature, the control portion 900 controls the heating guidance portion 610 to control a voltage, a current, or a pulse width modulation (PWM) of the DC power supply, which is delivered to the electrode 710, lowering the temperature of the electrode 710.

Furthermore, the control portion 900 may execute a correction process for correcting a critical value stored in the storage portion 300. In other words, in a case of receiving a critical value setup signal from the input portion 100, the control portion 900 determines whether a change in capacitance is received from the contact detector 700, determines a correction value by comparing a reference value previously stored in the storage portion 300 with the change in capacitance delivered from the contact detector 700, and sets a determined correction value as a critical value to restore the value in the storage portion 300. For example, the control portion 900 receives a touch input five times from the contact detector 700, checks a change in first capacitance with respect to touches, and stores the change in the storage portion 300. As such, the control portion 900 receives input by the gripping of one hand five times from the contact detector 700, checks a change in second capacitance with respect to the gripping of one hand, and stores the change in the storage portion 300. As such, the control portion 900 receives input by the gripping of both hands five times, checks a change in third capacitance with respect to the gripping of both hands, and stores the change in the storage portion 300. After that, the control portion 900 determines a first correction value by comparing a first reference value stored in the storage portion 300 with the change in first capacitance, determines a second correction value by comparing a second reference value stored in the storage portion 300 with the change in second capacitance, and determines a third correction value by comparing a third reference value in the storage portion 300 with the change in third capacitance. After that, the control portion 900 stores the first correction value in the storage portion 300 as the first reference value and the first critical value, stores the second correction value in the storage portion 300 as the second reference value and the second critical value, and stores the third correction value in the storage portion 300 as the third reference value and the third critical value.

After that, to check whether the corrections are properly processed, the control portion 900 determines three conditions, i.e., the change in first capacitance with respect to the touches is the first critical value or more by receiving the touch input five times from the contact detector 700, the change in second capacitance with respect to the gripping of one hand is the second critical value or more by receiving the input by the gripping of one hand five times from the contact detector 700, and the change in third capacitance with respect to the gripping of both hands is the third critical value or more by receiving the input by the grip of both hands five times from the contact detector 700. After that, if all the three conditions are satisfied, the control portion 900 applies the critical values, and if not, the correction processes are executed again.

Figure 9:
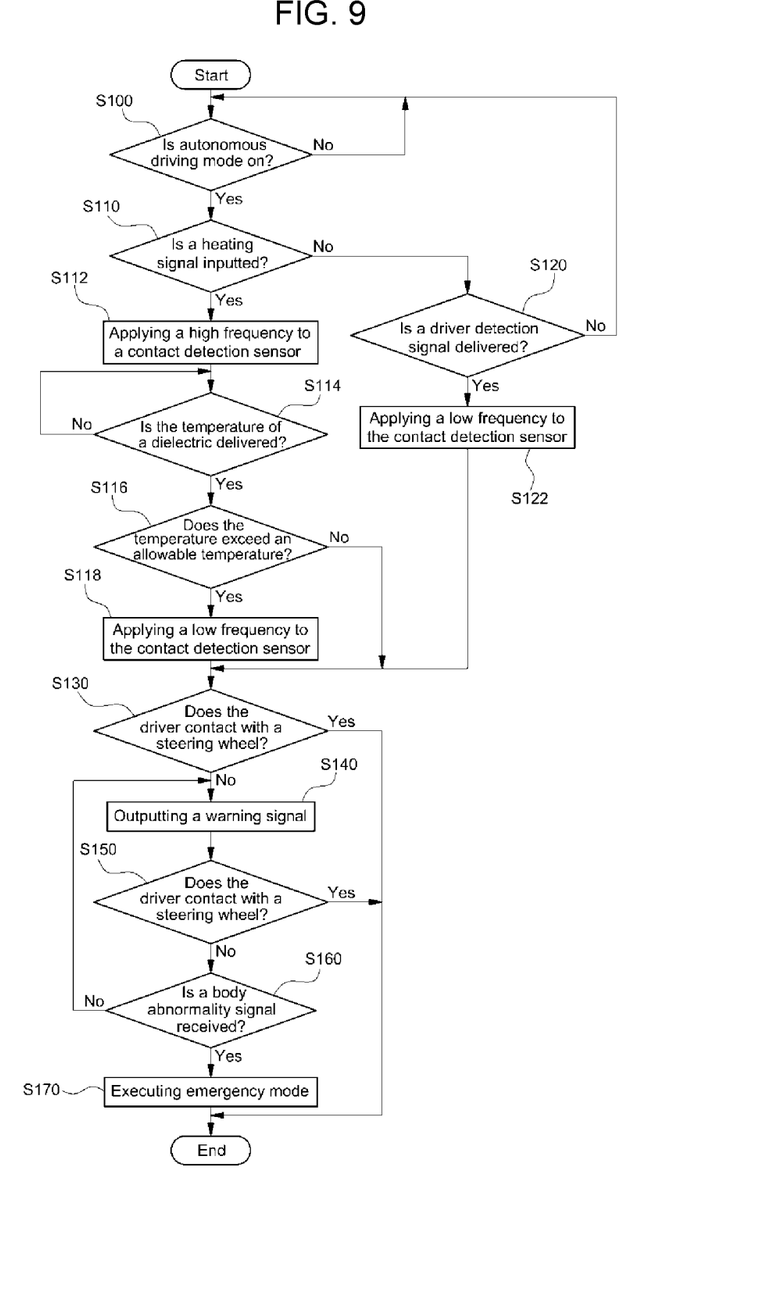
FIG. 9 is a flow chart schematically illustrated for describing a grip detection method of a steering wheel for an autonomous vehicle according to an exemplary embodiment of the present invention.

FIG. 9 is a flow chart schematically illustrated for describing a grip detection method of a steering wheel for an autonomous vehicle according to an exemplary embodiment of the present invention.

With reference to FIGS. 1 to 9, according to the grip detection method of a steering wheel for an autonomous vehicle in accordance with various exemplary embodiments of the present invention, the input portion 100 delivers a signal from the autonomous driving portion 210, so that the control portion 900 determines whether the autonomous driving portion 210 autonomously drives the vehicle at the instant time (S100). After that, the control portion 900 determines whether a heating signal is input from the input portion 100 (S110). When the heating signal is input from the input portion 100, the control portion 900 controls the heating guidance portion 610, and controls the heating guidance portion 610 to apply a high frequency to the contact detector 700 (S112). As such, the electrode 710 of the contact detector 700 receives the high frequency and forms capacitance, and the dielectric 720 of the contact detector 700 absorbs the high frequency and releases the high frequency as thermal energy. After that, when the control portion 900 receives the temperature of the dielectric 720 from the wheel temperature sensor 730 (S114), the control portion 900 determines whether the temperature of the dielectric 720, which is measured by the wheel temperature sensor 730, exceeds a predetermined allowable temperature (S116). In the step of S116, after the determination, in case that the temperature of the dielectric 720, which is measured by the wheel temperature sensor 730, exceeds the predetermined temperature, the control portion 900 controls the heating guidance portion 610 not to apply the high frequency any more. After that, the control portion 900 controls the low frequency generation portion 600 to apply a low frequency to the contact detector 700, and executes the step of S130 which will be described later (S118). In the step of S116, in case that the temperature of the dielectric, which is measured by the wheel temperature sensor 730, does not exceed the predetermined allowable temperature, the control portion 900 skips the step of S118, and executes the step of S130 which will be described later.

In the step of S112, if the heating guidance portion 610 is constituted to apply a DC power supply instead of a high frequency to the contact detector 700, the electrode 710 of the contact detector 700 forms capacitance by receiving the DC power supply, and releases thermal energy due to the resistance caught by the electrode where the current of the DC power supply flows. After that, when the control portion 900 receives the temperature of the electrode 710 from the wheel temperature sensor 730 in the step of S114, the control portion 900 determines whether the temperature of the electrode 710, which is measured by the wheel temperature sensor 730, exceeds the predetermined allowable temperature in the step of S116. After the determination, if the temperature of the electrode 710, which is measured by the wheel temperature sensor 730, exceeds the predetermined allowable temperature in the step of S116, the control portion 900 controls the heating guidance portion 610 to control a voltage, a current, or a pulse width modulation (PWM) of the DC power supply, lowering the temperature of the electrode 710. After that, in the step of S118, the control portion 900 controls the low frequency generation portion 600 to apply a low frequency to the contact detector 700. Consequently, the control portion 900 controls the electrode 710 of the contact detector 700 to form capacitance, and controls the dielectric 720 of the contact detector 700 to amplify the capacitance.

In the step of S110, if the heating signal is not input, the control portion 900 determines whether a driver detection signal is delivered from the counter 500 (S120). After that, when the driver detection signal is delivered from the counter 500, the control portion 900 controls the low frequency generation portion 600 to apply the low frequency to the contact detector 700 (S122). As such, the electrode 710 of the contact detector 700 receives the low frequency and forms capacitance, and the dielectric of the contact detector 700 amplifies the capacitance. After that, the control portion 900 executes the step of S130 which will be described later.

The step of S130 is to determine whether the driver grips the steering wheel S. Accordingly, the control portion 900 determines whether a change in capacitance is received from the contact detector 700 due to contact between the driver and the steering wheel S. After that, if the change in capacitance is received from the contact detector 700, the control portion 900 determines that the driver contacts with the steering wheel S. On the other hand, if the change in capacitance is not received from the contact detector 700, the control portion 900 determines that the driver does not contact with the steering wheel S (S130).

After that, if it is determined that the driver does not contact with the steering wheel S, the control portion 900 generates a warning signal and delivers the warning signal to the output portion 400, and then controls the output portion 400 to output the warning signal to the outside (S140). The output portion 400 is constituted to output a warning sound or siren sound, such as "the driver is not gripping the steering wheel S" or "the vehicle will be stopped because the driver is not gripping the steering wheel S," to the outside.

After that, the control portion 900 checks again whether the change in capacitance is received from the contact detector 700 (S150). After that, if the control portion 900 receives the change in capacitance from the contact detector 700, it is determined that the driver contacts with the steering wheel S, terminating a situation. On the other hand, in the step of S150, if the change in capacitance is not received from the contact detector 700, it means that the driver still does not contact with the steering wheel S. Accordingly, the control portion 900 determines whether the body abnormal signal of the driver is received from the driver monitoring portion 220 (S160). In the step of S160, if the control portion 900 does not receive the body abnormal signal from the driver monitoring portion 220, the control portion 900 controls the output portion 400 to output the warning signal to the outside by executing the step of S140 again. On the other hand, in the step of S160, if the control portion 900 receives the body abnormal signal from the driver monitoring portion 220, the control portion 900 executes an emergency mode (S170). In case that the control portion 900 executes the emergency mode, when an unexpected situation occurs where the autonomous driving portion 210 cannot autonomously and safely drive the vehicle, the control portion 900 determines that the driver cannot rapidly and manually drive the vehicle even if driving authority is provided to the driver. Accordingly, the control portion 900 controls the vehicle to park the vehicle on the side of a road, or to stop the vehicle.

The present invention has an effect of rapidly switching to manual mode in an unexpected situation by periodically checking whether the driver intends to manually drive the vehicle during autonomous driving.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A grip detection system of a steering wheel for a vehicle, the system comprising:
   an autonomous driving portion which autonomously drives the vehicle;
   a contact detector which is mounted on the steering wheel of the vehicle, and detects a change in capacitance caused by contact between a driver and the steering wheel;
   a controller which is connected to the autonomous driving portion and the contact detector and determines that the driver contacts with the steering wheel when the change in the capacitance is received from the contact detector, and generates a warning signal when determining that the driver does not contact with the steering wheel when the change in the capacitance is not received from the contact detector;
   an output portion which is connected to the controller, receives the warning signal from the controller, and outputs warning to outside of the output portion;
   a low frequency generation portion which is connected to the controller and configured to generate a low frequency and deliver the low frequency to an electrode according to the controller;
   a heating guidance portion which is connected to the controller and is configured to generate a high frequency which is higher than the low frequency and deliver the high frequency to the electrode according to the controller; and
   an input portion which is connected to the controller and receives a heating signal from the driver and delivers the heating signal to the controller;
   wherein the contact detector includes:
   the electrode which is provided along an internal circumference of the steering wheel of the vehicle, and forms the capacitance; and
   a dielectric which is stacked on the electrode, and amplifies the capacitance formed by the electrode,
   wherein the controller controls the low frequency generation portion to generate the low frequency while receiving the driver detection signal, and controls the high frequency generation portion to generate the frequency while receiving the heating signal,
   wherein, when the low frequency generation portion generates the low frequency, the electrode forms the capacitance, and the dielectric amplifies the capacitance, and wherein, when the heating guidance portion generates the high frequency, the high frequency is applied to the electrode, and the dielectric absorbs the high frequency and releases the high frequency as thermal energy.

2. The grip detection system of claim 1, wherein the dielectric includes a carbon micro coil (CMC) or a carbon nano coil (CNC).

3. The grip detection system of claim 2, wherein the dielectric is formed to have elastic force.

4. The grip detection system of claim 1, further including:
a counter which periodically counts time, and delivers a driver detection signal to the controller at a predetermined time interval.

5. The grip detection system of claim 4, further including:
a temperature sensor for measuring a temperature of the dielectric,
wherein, in a state that the heating guidance portion generates the high frequency, when the temperature of the dielectric, which is measured by the temperature sensor, exceeds a predetermined allowable temperature, the controller is configured to control the heating guidance portion not to generate the high frequency, and controls the low frequency generation portion to generate the low frequency.

6. The grip detection system of claim 4, wherein the electrode includes:
a first electrode receiving the low frequency from the low frequency generation portion; and
a second electrode receiving the high frequency from the heating guidance portion.

7. The grip detection system of claim 1, further including:
the low frequency generation portion which is connected to the controller and
configured to generates the low frequency lower than a predetermined frequency and deliver the low frequency to the electrode according to the controller;
the heating guidance portion which is connected to the controller and configured to receives a power supply, and delivers the power supply to the electrode according to the controller;
a counter which periodically counts time, and delivers a driver detection signal to the controller at a predetermined time interval; and
the input portion which is connected to the controller and configured to receive the heating signal from the driver and deliver the heating signal to the controller,
wherein the controller is configured to control the low frequency generation portion to generate the low frequency while receiving the driver detection signal, and controls the heating guidance portion to deliver the power supply to the electrode while receiving the heating signal, wherein,
when the low frequency generation portion generates the low frequency, the electrode forms the capacitance, and the dielectric amplifies the capacitance, and
wherein, when the heating guidance portion delivers the power supply, a current flows through the electrode, generating heat by resistance of the electrode.

8. The grip detection system of claim 7, further including:
a temperature sensor for measuring a temperature of the dielectric,
wherein, in a state that the heating guidance portion delivers the power supply, when the temperature of the electrode, which is measured by the temperature sensor, exceeds a predetermined allowable temperature, the controller is configured to control the heating guidance portion to control a voltage, a current or a pulse width modulation (PWM) of the power supply delivered to the electrode.

9. The grip detection system of claim 1, further including:
a driver monitoring portion connected to the controller and configured for monitoring a body abnormality signal of the driver,
wherein, while generating the warning signal, the controller is configured to determine when the body abnormality signal of the driver is received from the driver monitoring portion, and the warning signal is output to the output portion by the controller when the body abnormality signal of the driver is not received from the driver monitoring portion, and an emergency mode is executed by the controller when the body abnormality signal of the driver is received by the controller from the driver monitoring portion.

10. The grip detection system of claim 9, wherein, while executing the emergency mode, the controller is configured to control the autonomous driving portion to park the vehicle on an edge portion of a road, or to stop the vehicle.

11. The grip detection system of claim 1, further including:
a storage portion connected to the controller, wherein a first predetermined value and a reference value with respect to the change in the capacitance are stored in the storage portion; and
the input portion which is connected to the controller and configured to input a predetermined value setup signal to the controller,
wherein, when the change in the capacitance is received by the controller from the contact detector after the predetermined value setup signal is received from the input portion, the controller is configured to determine a correction value by comparing the change in the capacitance with the reference value, and stores a determined correction value in the storage portion by setting up the determined correction value as a second predetermined value.

12. A grip detection method of a steering wheel for a vehicle, the method comprising:
a detection process of receiving, by the controller, a driver detection signal from a counter which periodically counts time;
a reception process of receiving, by a controller, a change in capacitance caused by contact between a driver and the steering wheel, from a contact detector mounted on the steering wheel of the vehicle;
a determination process of determining, by the controller, that the driver contacts with the steering wheel when the controller receives the change in the capacitance from the contact detector, and of determining, by the controller, that the driver does not contact with the steering wheel when the change in the capacitance is not received by the controller from the contact detector;
a generation process of generating a warning signal when the controller determines that the driver does not contact with the steering wheel; and
an output process of outputting, by an output portion connected to the controller to output warning to an outside of the output portion by the controller delivering the warning signal to the output portion,
wherein the reception process includes:
a control step, wherein, while receiving the driver detection signal, a low frequency generation portion connected to the controller applies a low frequency lower than a predetermined frequency to the contact detector, controlling an electrode of the contact detector configured to form the capacitance, and a dielectric of the contact detector configured to amplify the capacitance; and a reception step of receiving, by the controller, a change in the capacitance amplified by the dielectric, the capacitance caused by the contact between the driver and the steering wheel before the reception process, an input process, wherein a heating signal is received by the controller from an input portion connected to the controller; and a process of applying a high frequency, wherein, while receiving the heating signal, a heating guidance portion connected to the controller applies to the high frequency higher than predetermined frequency to the contact detector, so that the electrode of the contact detector forms the high frequency, and the dialectic of the contact detector absorbs the high frequency and releases the high frequency as thermal energy.

13. The grip detection method of claim 12, further including;

after the process of applying the high frequency, a reception step, wherein a temperature of the dielectric is received by the controller from a temperature sensor; and a control step, wherein, when the temperature of the dielectric, which is measured by the temperature sensor, does not exceed a predetermined allowable temperature, the heating guidance portion is controlled by the controller not to apply the high frequency, wherein the reception step includes:

a control process, wherein, when the heating guidance portion does not apply the high frequency, the low frequency generation portion applies the low frequency to the contact detector, controlling the electrode of the contact detector configured to form the capacitance, and the dielectric of the contact detector configured to amplify the capacitance; and a reception process, wherein a change in the capacitance amplified by the dielectric the due to contact between the driver and the steering wheel is received by the controller.

14. The grip detection method of claim 12, further including:

before the reception process, an input process, wherein the heating signal is received by the controller from the input portion connected to the controller; and a process of applying a power supply, wherein, while receiving the heating signal, a heating guidance portion connected to the controller applies the power supply to the contact detector, so a current flows through the electrode of the contact detector, and heat is generated by resistance of the electrode.

15. The grip detection method of claim 14, further including:

after the process of applying the power supply, a reception step, wherein a temperature of the dielectric is received by the controller from a temperature sensor connected to the controller; and a control step, wherein, when the temperature of the dielectric, which is measured by the temperature sensor, exceeds a predetermined allowable temperature, the heating guidance portion controls a voltage, a current, or a pulse width modulation (PWM) of the power supply, lowering a temperature of the electrode according to the controller, wherein the reception step includes:

a control process, wherein, when the heating guidance portion controls the voltage, the current, or the pulse width modulation (PWM) of the power supply, the low frequency generation portion applies the low frequency to the contact detector, so that the electrode of the contact detector forms the capacitance, and the dielectric of the contact detector amplifies the capacitance; and a reception process, wherein a change in the capacitance amplified by the dielectric due to the contact between the driver and the steering wheel is received by the controller.

16. The grip detection method of claim 12, further including:

after the input process, a process of determining abnormality when a body abnormality signal of the driver is received by the controller from a driver monitoring portion which is connected to the controller and monitors the body abnormality signal of the driver; and a process of executing an emergency mode, wherein, when the body abnormality signal is not received from the driver monitoring portion, the input process is executed by the controller, and when the body abnormality signal of the driver is received from the driver monitoring portion, the emergency mode is executed by the controller.

17. The grip detection method of claim 16, wherein, in the process of executing the emergency mode, while executing the emergency mode, the controller is configured to control the vehicle to park on an edge portion of a road, or to stop the vehicle.

* * * * *